Feb. 28, 1967 L. J. O'BRIEN 3,306,354
METHOD FOR STORING FLUID IN A SUBTERRANEAN FORMATION
Filed June 5, 1964
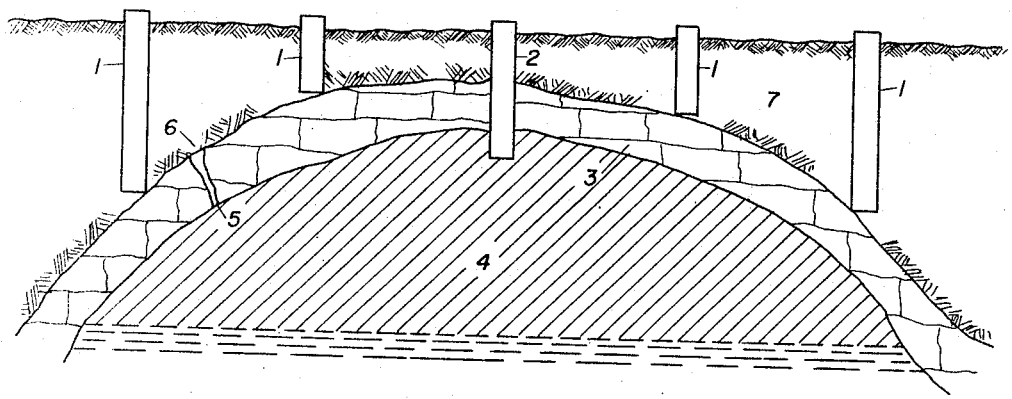
INVENTOR.
LEO J. O'BRIEN
BY
ATTORNEY.

3,306,354
METHOD FOR STORING FLUIDS IN A
SUBTERRANEAN FORMATION
Leo J. O'Brien, Crystal Lake, Ill., assignor, by mesne assignments, to Union Oil Company of California, Los Angeles, Calif., a corporation of California
Filed June 5, 1964, Ser. No. 372,762
15 Claims. (Cl. 166—29)

This invention relates to a method for storing fluids in natural porous subterranean formations and is more particularly concerned with a method for storing such fluids as natural gas, wherein the natural gas is not deleteriously affected by agents injected into a subterranean formation to facilitate the storage of said gas. The invention is also directed to a method whereby gas leakage from the area adjacent a well casing is prohibited, wherein said wells have been drilled into a gas storage area to initially inject the gas to be stored in the formation.

It is well known to store fluids such as liquefied petroleum gas and natural and other hydrocarbon gases in natural subterranean formations by injecting the fluids or gases under pressure into a well drilled into the formation. Where a fluid, which is normally gaseous at standard atmospheric pressures, is desired to be stored it is only necessary that injection pressures be sufficiently high to maintain the injected fluid or normally gaseous hydrocarbon at a pressure sufficient to maintain the fluid state under reservoir temperatures. In other instances where the fluid sought to be stored is to be maintained in the gaseous state lower pressures may be utilized. The amount of fluid or gas which can be stored depends on a number of factors such as the pressure under which it is injected, the permeability of the formation into which the fluid is injected, and the amount of interstitial water and/or hydrocarbons retained in the formation. Suitable formations in which to store fluids are mobile water-bearing porous rock formations having a substantially impervious rock cap which seals the formation and prevents loss of the gas. Such formations are commonly referred to as aquifers. The term "aquifer" will hereafter be used to mean subterranean porous mobile water-bearing rock formations overlain by an impervious rock cap which rock cap is substantially fluid impermeable but which may contain faults, fissures, and cracks, etc. Gas or fluids can also be stored in subterranean oil-bearing reservoirs or formations containing mobile water, but ideally such formations should have a substantially fluid-impermeable stratum above that area of the reservoir or formation in which fluids are to be stored. Characteristic of both the aquifer and reservoir formations is the presence of a substantially fluid-permeable zone or stratum above the substantially fluid-impermeable cap rock zone or stratum below which the fluid or gas is to be stored.

There has been heretofore a method of storing a fluid such as natural gas in an underground formation, reservoir, or aquifer wherein a foam-forming substance is injected into the gas storage area such that an envelope of foam is formed beneath the substantially fluid-impervious or impermeable cap rock or stratum. By these methods, the injected foaming agent, upon contact with the water in the reservoir, or aqueous vehicle in which the foaming agent has been injected into the storage zone and gas, a foam envelope is formed which inhibits the escape of gas from without the gas storage zone. However, by these disclosed methods the fluid or gas to be stored may become contaminated to some extent with the foam formed within the gas or fluid storage area. I have now discovered a means of storing fluids and hydrocarbon gases in aquifers and in natural subterranean formations or reservoirs wherein the fluid to be stored is not contaminated with the agent that facilitates the storage of said fluids. Basically, my invention resides in injecting into the fluid-permeable stratum or zone immediately above the substantially fluid-impermeable cap rock zone or stratum of the aquifer formation or reservoir, a material which, when disposed within the interstices of the fluid-permeable zone of the formation or within the faults, fissures, cracks, etc., of the substantially fluid-impermeable stratum renders the stratum in which it is disposed substantially fluid-impermeable.

In carrying out my invention in its various embodiments, the injected material may be placed in the interstices of the fluid-permeable zone overlying the substantially fluid-impermeable cap rock or stratum before or after the fluid or gas to be stored has been injected into the storage area. I have also found that the same well or wells in which the fluid to be stored is injected may be utilized for injecting the materials which, when disposed in the interstices of the stratum above the cap rock will render that stratum substantially fluid-impermeable. In another embodiment of my invention where the cap rock or substantially impermeable stratum is fissureless or faultless, thereby obviating the need to inject a porosity reducer in that zone or stratum above said cap rock, loss of the injected gas is prohibited by disposing a sealant in that portion of the formation immediately adjacent to the well casing whereby the injected gas cannot escape through the area formed by the well casing penetrating the formation and the formation walls.

It is an object of this invention to provide an improved method for storing fluids including liquefied, normally-gaseous hydrocarbons, hydrocarbon gas, and natural gas in reservoirs beneath the earth's surface.

It is another object of this invention to provide a substantially fluid-impermeable storage area in a subterranean formation suitable for the storage of gases.

It is another object of this invention to provide a means of storing natural gas in an aquifer wherein the loss of stored gas is substantially reduced.

It is a further object of this invention to provide a method for minimizing gas leakage from a gas storage reservoir around the well casing.

These and other objects of my invention will be further described and will become readily apparent from the following description read in conjunction with the drawing wherein a typical subterranean formation suitable for the storage of hydrocarbon fluids is illustrated in cross-section.

While throughout the hereinafter described mode of practicing the invention, the invention is defined and described with the use of a foam or foaming agent as a permeability decreasing agent or substance, it will be apparent and clear to those skilled in the art that similar porosity or permeability reducing agents may be used that are commonly known in the art such as those materials which are used to plug permeable strata in oil recovery operations. Examples of these various plugging materials are polymers, gels, etc., which upon introduction into the permeable strata tend to decrease the permeability to such an extent that the stratum becomes substantially fluid-impermeable. These various polymers, gels, etc. may be catalyzed by an alkaline or acidic catalyst, temperature, pressure, and radioacivity whereby substantial interstitial plugging of the stratum results. However, due to ease of handling, economics involved, and definiteness of the resultant plugging action, it is preferred to use a surfactant which, upon intimate contact with water and gas generates a foam in the interstices of the fluid-permeable stratum above the cap rock which foam is stable under reservoir conditions. Examples of the gel, resin, and polymer-forming materials which will satisfactorily have application and adaptability in my invention are materials such as beta-lactones, styrene, diphenyl benzene copolymers, acrylamide, and generally any of those materials which have heretofore been successfully used in the art as plugging materials wherein resins, gels, etc., are formed within the interstices of the formation into which they are injected.

As foam-producing agents, any one of a number of water-soluble surfactive agents which have foam-producing properties may be used. As examples of such foam-producing agents may be mentioned dimethyl didodecyl ammonium chloride, methyl trioctenyl ammonium iodide, trimethyl decenyl ammonium chloride, dibutyl dihexadecenyl ammonium chloride; water-soluble salts of esters of $C_3$–$C_6$ sulfo dicarboxylic acids having the general formula

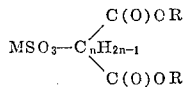

where M is a substituent forming a water-soluble salt, such as alkali metals, ammonium, and substituted ammonium, R is $C_3$–$C_{16}$ alkyl substituent, and $n$ is an integer from 1–4, e.g., monosodium dioctyl sulfosuccinate, ammonium dilaurylsulfosuccinate, monosodium dibutyl sebacate, monosodium diamyl sulfoadipate; and others; and water-soluble perfluoroalkanoic acids and salts having 3–24 carbon atoms per molecule, e.g., perfluoroctanoic acid, perfluoropropanoic acid, perfluorononanoic acid. Other surface active agents which have the ability to produce foam under the conditions above set forth are:

| Trade name: | Chemical name |
|---|---|
| Aerosol C-61 | Ethanolated alkyl guanidine-amine complex. |
| Aerosol OS | Isopropyl naphthalene sodium sulfonate. |
| Aerosol OT | Dioctyl sodium sulfosuccinate. |
| Arquad 2C | Dicoco dimethyl ammonium chloride. |
| Arquad T | Tallo trimethyl ammonium chloride. |
| Duponol EP | Fatty alcohol alkylolamine sulfate. |
| Duponol RA | Modified ether alcohol sulfate sodium salt. |
| Duponol WAQ | Sodium lauryl alcohol sulfate. |
| Ethomid HT-60 | Condensation of hydrogenated tallow amide and ethylene oxide. |
| Hyonic FA-75 | Modified fatty alkylolamide. |
| Miranol HM Concentrate | Ethylene cycloiodo 1-lauryl, 2-hydroxy ethylene Na alcoholate, methylene Na carboxylate. |
| Miranol MM Concentrate | Same as Miranol HM except myristyl group is substituted for lauryl group. |
| Nacconal NR | Alkyl aryl sulfonate. |
| Ninol AAA62 | Lauric diethanolamide. |
| Ninol 1001 | Fatty acid alkanolamide. |
| Petrowet R | Sodium alkyl sulfonate. |
| Pluronic L44 | Condensation product of ethylene oxide with propylene glycol. |
| Product BCO | C-cetyl betaine. |
| Renex 650 | Polyoxyethylene alkyl aryl ether. |
| Sorbit AC | Sodium alkyl naphthalene sulfonate. |
| Sulfanole FAF | Sodium salt of fatty alcohols sulfated. |
| Triton AS-30 | Sodium lauryl sulfate. |
| Triton X-100 | Alkyl aryl polyether alcohol. |

Referring to the drawing, injection wells 1, through which the material is to be injected into the more permeable stratum 7, located above cap rock 3, are drilled to a depth in the formation to a point just above the cap rock 3, which, while substantially fluid-impermeable, contains fisures, cracks, and faults 5 communicating fluid or gas storage area 4 with stratum or zone 7. Well 2 is an injection well located within the peripheral area formed by injection wells 1, and is drilled to a depth sufficient to communicate storage area 4 with the surface. Alternatively, well 2 can be used as the sole injection well and in so doing it is initially drilled to a point just above cap rock 3 at which time drilling is terminated and plugging agent is introduced through well 2 to completely saturate the area 7 located above cap rock 3. Thereafter, drilling is again commenced until cap rock 3 has been penetrated, at which time the fluid or gas to be stored may be injected into storage area 4.

Another method wherein a single injection well is utilized comprises drilling the well 2 through cap rock 3 into storage area 4. Thereafter, that portion of the well casing coextensive with the stratum 7 is perforated and packers are set in the well casing at the approximate boundary of stratum 7 and cap rock 3 so as to isolate that portion of the casing coextensive with cap rock 3 and storage area 4 from the remainder of the well casing. A surfactant-containing solution is then injected into the well casing and because of the packers is driven into the stratum 7 through the perforated casing passing therethrough. After the surfactant-containing solution has been injected, the perforations are sealed with a sealant such as cement, the packers removed, and the gas to be stored is injected into the well casing and into storage area 4. In this instance, gas escaping from area 4 will contact the surfactant-containing solution in stratum 7 thereby generating a plugging foam which will inhibit the further loss of the stored gas into stratum 7.

In accordance with this invention, one or more wells 1 and 2 are drilled as heretofore indicated with at least one well, 2, piercing cap rock 3. Beefore or after introduction of the material to be stored in storage area 4, a substance capable of plugging and reducing the permeability of formation 7 is injected into wells 1. While resins, plastics, polymers, and other plugging materials may be utilized, it is desirable in the preferred embodiment to inject a slug of aqueous vehicle containing approximately 0.001 to 1 percent by weight of a foaming agent. The aqueous vehicle will normally comprise approximately 0.001 to 0.5 pore volume of the formation or strata 7 to be treated. The aqueous vehicle or slug, which may be injected in singular slug or multiple slug form, may also contain molasses or polymerized ethylene oxide and other thickening and viscosity increasing agents in addition to the foaming agent such that the viscosity of the aqueous slug is about 10 centipoises at reservoir, aquifer, or formation temperature.

Saturation of the aqueous foaming agent-containing slug with carbon dioxide at superatmospheric pressures of from about 100–1000 p.s.i. may also be desirable. A slug of gas or, where multiple slugs of aqueous solution are injected into the formation located immediately above the cap rock, multiple slugs of gas may follow the foam-containing solution into the formation. Where the aqueous solution containing the foaming agent is followed by gas, foam will immediately form in that area above the cap rock, thereby confining any subsequently injected fluid or hydrocarbon gas to be stored in the storage zone located beneath the cap rock. Where the surfactant-containing solution alone is injected into the formation, foam will only be generated when the subsequently injected gas or material to be stored is placed beneath the cap rock in the storage zone. For instance, if surfactant-containing solution alone is injected into wells 1 such that zone 7 of the formation becomes saturated with said solution and thereafter a hydrocarbon gas is injected via well 2 into gas storage zone 4, foam will not be formed within storage zone 7 until the stored gas 4 channels through fissure 5 contacting the surfactant-containing solution at point 6 opposite the fracture 5 of cap rock 3. In other instances, where the aqueous solution containing the surfactant or foaming agent is carbonated, foam will nevertheless be formed when said solution reaches point 6 since fault or fissure 5 will create a pressure gradient at point 6 causing the carbon dioxide or other gas to come out of solution, thereby generating foam and thusly plugging fissure or fault 5 such that subsequently injected hydrocarbon gas to be stored will not escape from within the confines of storage area 4. When it is desired to recover gas from the formation in which it is stored, it can be withdrawn, uncontaminated, through the injection well 2, or through other withdrawal wells which are drilled into the gas storage area 4.

It can thusly be seen in the foregoing description that a foam envelope is formed throughout a predominant part of the fluid-permeable stratum or zone located above the substantially fluid-impermeable cap rock or stratum such that any of the injected fluid or gas to be stored will not escape from the storage area and will not be contaminated by the material which forms the substantially fluid impermeable envelope above the cap rock which isolates the gas storage zone from the remainder of the subterranean formation.

In another embodiment of this invention (which may also be used in conjunction with the aforedescribed process), it has been found that, where the cap rock or substantially fluid-impermeable stratum below which a hydrocarbon gas or normally gaseous liquefied hydrocarbon is to be stored is sufficiently fluid-impermeable so as not to necessitate treatment of the formation overlying the cap rock as heretofore described, gas leakage from around the casing of the gas injection well can be prohibited. For instance, once the injection wells have been drilled down into the aquifer or other storage area to be utilized for the storage of natural gas, and casings have been disposed within the well, it is commonplace for the injected gas to escape through the annular space formed by the exterior of the well casing and the interior well bore surface because of the loose fit of the casing against the interior of the well bore. While, heretofore, in the prior art, it has been suggested to cement or pack off this area, such methods have only been applicable to the oil recovery art wherein it has been desirous to completely seal the formation around the well bore to prohibit the influx of fluids from the various strata into the bottom of the well bore. However, in accordance with this embodiment a foam is placed within the interstices of the formation immediately adjacent to the well casing such that the foam tends to block or entirely inhibit the escape of gas therethrough. The means of disposing the foam within this area are those well known in the art and need not be explored in detail here except to state that where the gas or other material to be stored has already been injected into the storage zone that zone may or may not be packed off, the casing perforated throughout its entire extent, and an aqueous surfactant solution injected into the well casing such that the solution penetrates the formation immediately surrounding the well casing. After the injection of the aqueous surfactant containing solution, gas may be injected to generate foam within this immediate area so that the stored gas is incapable of passing through the formation immediately surrounding the well casing. Thereafter the perforations may be sealed as with a cement or other material so that the generated foam will not be forced out back into the well bore. In lieu of injecting gas immediately after the surfactant containing solution, the perforations may be sealed and generation of foam will then be dependent upon the limited loss of gas from the gas storage zone which ultimately will prevent additional gas from escaping.

As an example of the invention an aquifer having a permeability of 1000 millidarcies and a porosity of 18% and having a thickness of 100 feet and an area of $10^8$ square feet has a cap rock stratum overlying the gas storage area wherein the cap rock permeability is 0.001 millidarcy. Above the cap rock the formation or surrounding stratum, having a thickness of 50 feet and an area of $10^8$ square feet, has a permeability of 500 millidarcies. A well is drilled to the more permeable stratum located just above the cap rock and there is injected through the well 0.1 pore volume of the permeable formation above the cap rock of a brine solution containing about 1% of sodium chloride obtained from the formation and in which is dissolved 0.1% by weight of Arquad 2C, a proprietary dicoco dimethyl ammonium chloride marketed by the Armour Industrial Chemical Company. After slug injection of the surfactant solution, 0.2 pore volume of natural gas is injected to contact the surfactant thereby generating foam in the permeable stratum above the cap rock. After foam generation the well is drilled to a depth sufficient to penetrate the cap rock and to contact the porous portion of the reservoir below the cap rock stratum. Thereafter natural gas in injected into the same well under a pressure of 800 pounds per square inch.

It can thusly be seen that I have discovered a new, efficient, economical method for storing liquified, normally gaseous hydrocarbons, natural gas and hydrocarbon gases in subterranean formations while maintaining the stored material in a substantially uncontaminated state. Many modifications will become apparent to those skilled in the art and will not depart from the scope and spirit of the herein disclosed invention. For instance, the foam envelope or dam need not be formed in situ but can be injected as a foam with the same resultant effect. However, because of the high pressures necessary, when pumping a foam into a formation, it is preferred to generate the foam in situ.

The embodiments of the invention in which an exclusive property or privilege is claimed are defined as follows:

1. In the method of storing a fluid in a subterranean formation wherein the fluid to be stored is injected at an elevated pressure into a first permeable fluid storage zone overlain by a stratum of relatively fluid impermeable cap rock and a second fluid permeable zone above said cap rock, the improvement which comprises inhibiting the leakage of said stored fluid from said first permeable fluid storage zone to said second permeable zone through flow passages in said cap rock by disposing a permeability reducing agent in said second permeable zone in proximity to said flow passages in sufficient amount to inhibit the leakage of said stored fluid through said cap rock.

2. The method in accordance with claim 1 wherein said permeability reducing agent is a surfactant capable of generating a foam upon intimate contact with gas and water.

3. The method in accordance with claim 1 wherein said permeability reducing agent is foam formed in situ by the injection of an agent which generates foam upon intimate contact with gas and water.

4. The method in accordance with claim 1 wherein said permeability reducing agent is a surfactant injected in an aqueous vehicle, the total amount of said vehicle comprising 0.001 to 0.5 pore volume of the fluid permeable stratum.

5. The method in accordance with claim 4 wherein said agent comprises approximately 0.001 to 1% of said aqueous vehicle.

6. In the method for storing hydrocarbon gas in a subterranean formation containing mobile water, the step of inhibiting leakage of gas through fractures in the cap rock by injecting, into the area of the formation immediately above said cap rock and in proximity to said fractures, foam-forming substance in sufficient amount to inhibit escape of gas therethrough.

7. In the method of storing a gas in a subterranean formation comprised of a first permeable storage zone overlain by a stratum of relatively impermeable cap rock and a second permeable zone above said cap rock wherein the gas to be stored is injected into said storage zone at an elevated pressure through at least one well penetrating said storage zone, the improvement which comprises inhibiting the leakage of gas from said storage zone through said cap rock to said second permeable zone by disposing an aqueous surfactant solution capable of generating foam upon contact with gas in said second permeable zone in proximity to the zones of leakage of said stored gas through said cap rock.

8. The method in accordance with claim 7 wherein said gas to be stored is natural gas.

9. The method defined in claim 7 wherein said aqueous surfactant solution contains between 0.001 to 1% surfactant, and wherein the volume of solution injected is between 0.001 to 0.5 pore volumes of said second permeable zone.

10. The method in accordance with claim 7 wherein said aqueous surfactant solution also contains a viscosity increasing agent in an amount sufficient to effect an increase in the viscosity of said aqueous surfactant solution.

11. The method in accordance with claim 10 wherein sufficient of said viscosity increasing agent is added to said aqueous surfactant solution to increase the viscosity of said solution to about 10 centipoises at formation temperature.

12. The method in accordance with claim 7 wherein said aqueous surfactant solution is also saturated with carbon dioxide at superatmospheric pressures of from about 100 to 1000 p.s.i.g.

13. The method in accordance with claim 7 wherein the leakage of gas from said storage zone is inhibited by alternately injecting slugs of aqueous surfactant solution and a gas into said second permeable zone above said cap rock.

14. The method in accordance with claim 7 wherein at least one of said wells penetrating said gas storage zone are plugged adjacent said cap rock and said aqueous surfactant solution injected into said second permeable zone through said well.

15. The method in accordance with claim 7 wherein said aqueous surfactant solution is injected into said second permeable zone through at least one separate well penetrating said second permeable zone and terminated adjacent said cap rock.

References Cited by the Examiner
UNITED STATES PATENTS

| | | | |
|---|---|---|---|
| 2,053,285 | 9/1936 | Grebe | 166—42 |
| 2,272,673 | 2/1942 | Kennedy | 166—10 |
| 2,866,507 | 12/1958 | Bond et al. | 166—42 X |
| 3,141,503 | 7/1964 | Stein | 166—29 |
| 3,185,634 | 5/1965 | Craig et al. | 166—9 |
| 3,196,944 | 7/1965 | Bernard et al. | 166—9 |

CHARLES E. O'CONNELL, *Primary Examiner.*

ERNEST R. PURSER, *Examiner.*

S. J. NOVOSAD, *Assistant Examiner.*